(12) United States Patent
Cutler et al.

(10) Patent No.: US 6,464,744 B2
(45) Date of Patent: Oct. 15, 2002

(54) DIESEL PARTICULATE FILTERS

(75) Inventors: Willard A. Cutler, Big Flats, NY (US); David L. Hickman, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 35 days.

(21) Appl. No.: 09/742,487

(22) Filed: Dec. 20, 2000

(65) Prior Publication Data

US 2002/0073666 A1 Jun. 20, 2002

Related U.S. Application Data (60) Provisional application No. 60/237,620, filed on Oct. 3, 2000.

(51) Int. Cl.[7] .............................................. B01D 46/00
(52) U.S. Cl. ........................ 55/482; 55/523; 55/DIG. 30
(58) Field of Search ..................... 55/482, 523, 385.3, 55/DIG. 30

(56) References Cited

U.S. PATENT DOCUMENTS

| | | | | |
|---|---|---|---|---|
| 3,698,875 A | * | 10/1972 | Yamada | |
| 4,281,512 A | * | 8/1981 | Mills | |
| 4,329,162 A | | 5/1982 | Pitcher, Jr. | |
| 4,373,330 A | * | 2/1983 | Stark | |
| 4,427,545 A | | 1/1984 | Arguilez | |
| 4,485,622 A | * | 12/1984 | Takagi et al. | |
| 4,673,423 A | * | 6/1987 | Yumlu | |
| 4,709,549 A | * | 12/1987 | Lepperhoff | |
| 4,866,932 A | * | 9/1989 | Morita et al. | |
| 4,894,074 A | * | 1/1990 | Mizrah et al. | |
| 4,913,712 A | * | 4/1990 | Gabathuler et al. | |
| 5,009,065 A | * | 4/1991 | Howe et al. | |
| 5,052,178 A | * | 10/1991 | Clerc et al. | |
| 5,203,166 A | * | 4/1993 | Miller | |
| 5,930,994 A | * | 8/1999 | Shimato et al. | |

* cited by examiner

Primary Examiner—Duane S. Smith
(74) Attorney, Agent, or Firm—Anca C. Gheorghiu (57) ABSTRACT

A ceramic filter which includes a plurality of end-plugged honeycomb structures which in combination act to trap and combust diesel exhaust particulates. The exhaust gas flows substantially equally through the end-plugged honeycombs. Preferably the ceramic filter includes two end-plugged honeycomb structures composed of a plurality of alternatingly end-plugged cell channels extending from an inlet face to an outlet face. The end-plugged honeycomb structures are arranged either parallel or perpendicular to the flow of the exhaust gas.

7 Claims, 7 Drawing Sheets

DIESEL PARTICULATE FILTERS

This application claims the benefit of U.S. Provisional Application No. 60/237,620, filed Oct. 3, 2000, entitled "Filter with Low Peak Regeneration Temperature", by Cutler et al.

BACKGROUND OF THE INVENTION

The present invention relates to filters for the removal of particulate material from diesel engine exhaust streams, and more particularly to a porous ceramic diesel exhaust filter of improved resistance to melting and thermal shock damage suitable for diesel exhaust systems which require long, narrow packaging.

Diesel traps have proven to be extremely efficient at removing carbon soot from the exhaust of diesel engines. The most widely used diesel trap is the wall-flow filter which filters the diesel exhaust by capturing the soot on the porous walls of the filter body. The wall-flow filter is designed to provide for nearly complete filtration of soot without significantly hindering the exhaust flow.

As the layer of soot collects on the surfaces of the inlet channels of the filter, the lower permeability of the soot layer causes a pressure drop across the filter and a gradual rise in the back pressure of the filter against the engine, causing the engine to work harder, thus affecting engine operating efficiency. Eventually, the pressure drop becomes unacceptable and regeneration of the filter becomes necessary. In conventional systems, the regeneration process involves heating the filter to initiate combustion of the carbon soot. Normally, the regeneration is accomplished under controlled conditions of engine management whereby a slow burn is initiated and lasts a number of minutes, during which the temperature in the filter rises from about 400–600° C. to a maximum of about 800–1000° C.

The highest temperatures during regeneration tend to occur near the outlet end of the filter due to the cumulative effects of the wave of soot combustion that progresses from the frontal inlet end to the outlet end as the exhaust flow carries the combustion heat down the filter. Under certain circumstances, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot may produce temperature spikes within the filter which can thermally shock and crack, or even melt, the filter.

Even more excessive temperature spikes can occur in long filters (i.e., filters having a length greater than 20.32 cm (8 inches)); additionally, long filters experience a higher pressure drop, increased occurrence of radial or ring-off breaks due to thermal gradients and are also difficult to manufacture and package. Therefore, long filters are not preferred in the industry of emissions control, nonetheless, a long, narrow space is often the allotted space in vehicle for the emission control system.

It would be considered an advancement in the art to obtain a filter which is suitable for diesel exhaust systems which require long, narrow packaging and also survives the numerous controlled regenerations over its lifetime, and the much less frequent but more severe uncontrolled regenerations. This survival includes not only that the diesel particulate filter remains intact and continues to filter, but that the back pressure against the engine remains low.

SUMMARY OF THE INVENTION

The present invention provides porous ceramic particulate exhaust filters offering improved configurations, particularly for long length emission systems, that are more resistant to thermal cracking and melting damage under typical diesel exhaust conditions than current filter designs. At the same time, the filters of the invention offer significantly lower pressure drops across the filter and superior resistance to soot-induced back-pressure buildup, than designs currently available.

In particular, the invention provides a ceramic filter which includes a plurality of end-plugged honeycomb structures which in combination act to trap and combust diesel exhaust particulates. The inventive filters are configured to allow for substantially equal exhaust gas flow through each end-plugged honeycomb structure, such that a long filter configuration is possible without the drawback associated with long filter lengths.

Temperature spikes which occur during regeneration, and especially during uncontrolled regeneration, are reduced in the inventive filters. At the same time, the inventive filter design provides filters with a low initial filter pressure drop and a reduction in the system pressure drop during use.

The inventive filters are especially advantageous for diesel exhaust systems where vehicle underbody space is limited and typically confined to long regions. Inventive filters are particularly suitable for lengths greater than 20.32 cm (8 inches).

In one embodiment the diesel exhaust particulate filter includes an enclosure provided with an inlet cone and an outlet cone for channeling exhaust gas through the filter; a first end-plugged honeycomb structure positioned adjacent the inlet cone, and a second end-plugged honeycomb structure positioned adjacent the outlet cone, the first end-plugged honeycomb structure and the second end-plugged honeycomb structure being positioned off-center within the enclosure such that the honeycomb structures are parallel to the flow of exhaust gas; and, means, for separating the unfiltered exhaust gas entering the filter from the exhaust gas filtered by the honeycomb structures.

In another embodiment the diesel exhaust particulate filter includes an enclosure provided with an inlet cone and an outlet cone for channeling exhaust gas through the filter; a first end-plugged honeycomb structure positioned adjacent the inlet cone, and a second end-plugged honeycomb structure positioned adjacent the outlet cone, the first end-plugged honeycomb structure and the second end-plugged honeycomb being centrally positioned and mounted side-by-side such that the honeycomb structures are perpendicular to the flow of exhaust gas; and, means for separating the unfiltered exhaust gas entering the filter from the exhaust gas filtered by the honeycomb structures.

BRIEF DESCRIPTION OF THE DRAWINGS

The invention may be further understood by reference to the drawings, wherein:

FIG. 4b presents a cross-sectional view of the embodiment of FIG. 4a.

FIG. 5b presents a cross-sectional view of the embodiment of FIG. 5a.

DETAILED DESCRIPTION OF THE INVENTION

Figure 1:
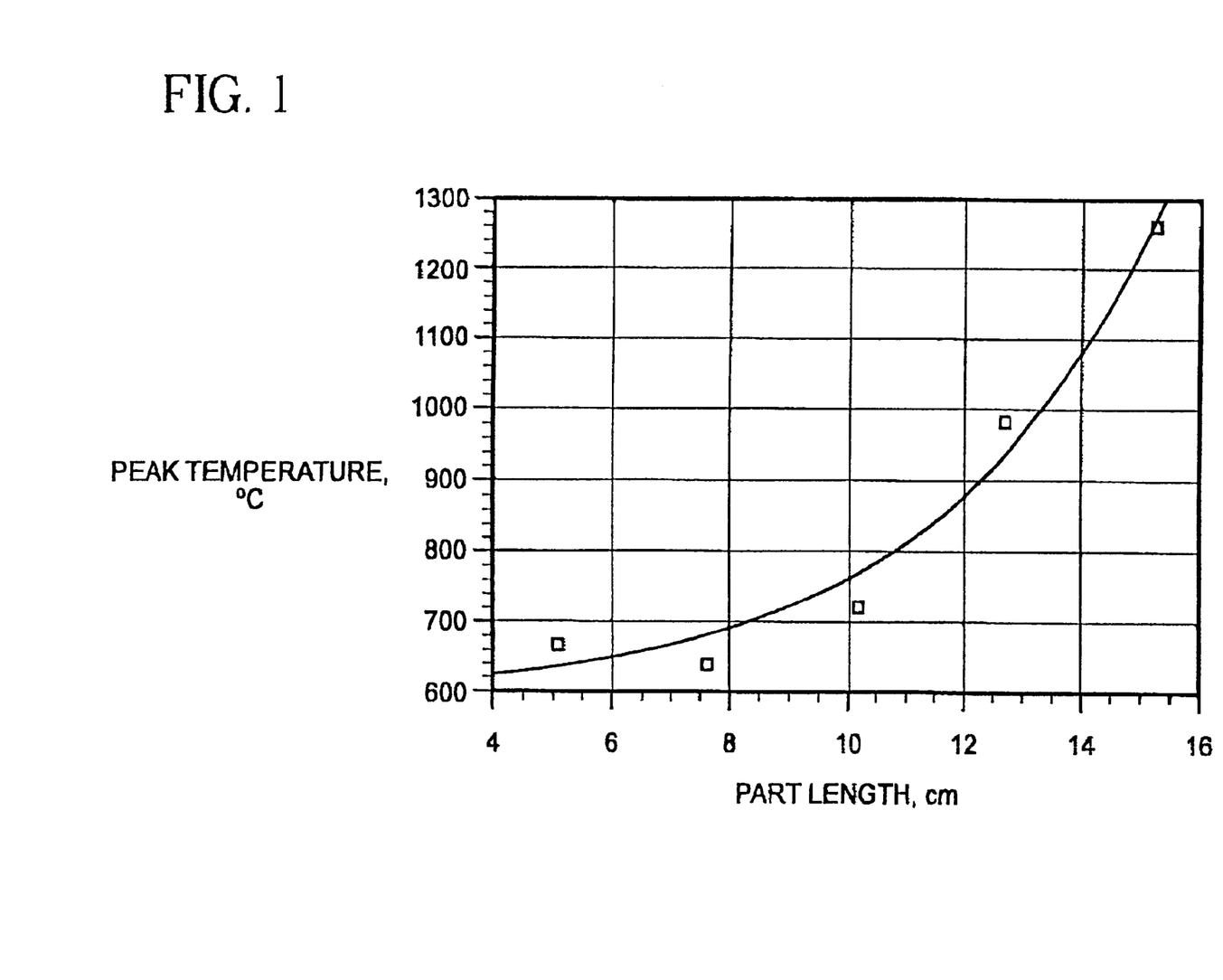
FIG. 1 presents a graph of temperature as a function of filter length for a cordierite porous ceramic filter.

As the art is well aware of, during the regeneration process the temperature of a wall flow filter increases due to the combustion of the carbon soot. However, the filter temperature is also affected by the length of the filter. FIG. 1 presents a graph illustrating the impact of filter length (plotted on the horizontal axis in inches) on peak temperature (plotted on the vertical axis in degrees Centigrade). As used herein "peak temperature" is the maximum temperature measured in the filter during the regeneration process. The testing was conducted on filters of the same volume and carbon soot loading but with differing lengths. The data reflect a dependence of filter temperature on filter length. Specifically, higher temperatures are observed in longer filters.

The data in FIG. 1 does not reflect the change in exhaust gas flow velocity as the filter diameter increases and the impact of this on temperature. However, not considering the effect of flow velocity, the temperature increases dramatically as the filters become longer.

The pressure drop across an end-plugged honeycomb structure depends on the resistance to laminar flow of gas down the cell channels and, as a second order effect, the extent of gas contraction and expansion occurring as the gas traverses the cellular structure.

Figure 2:
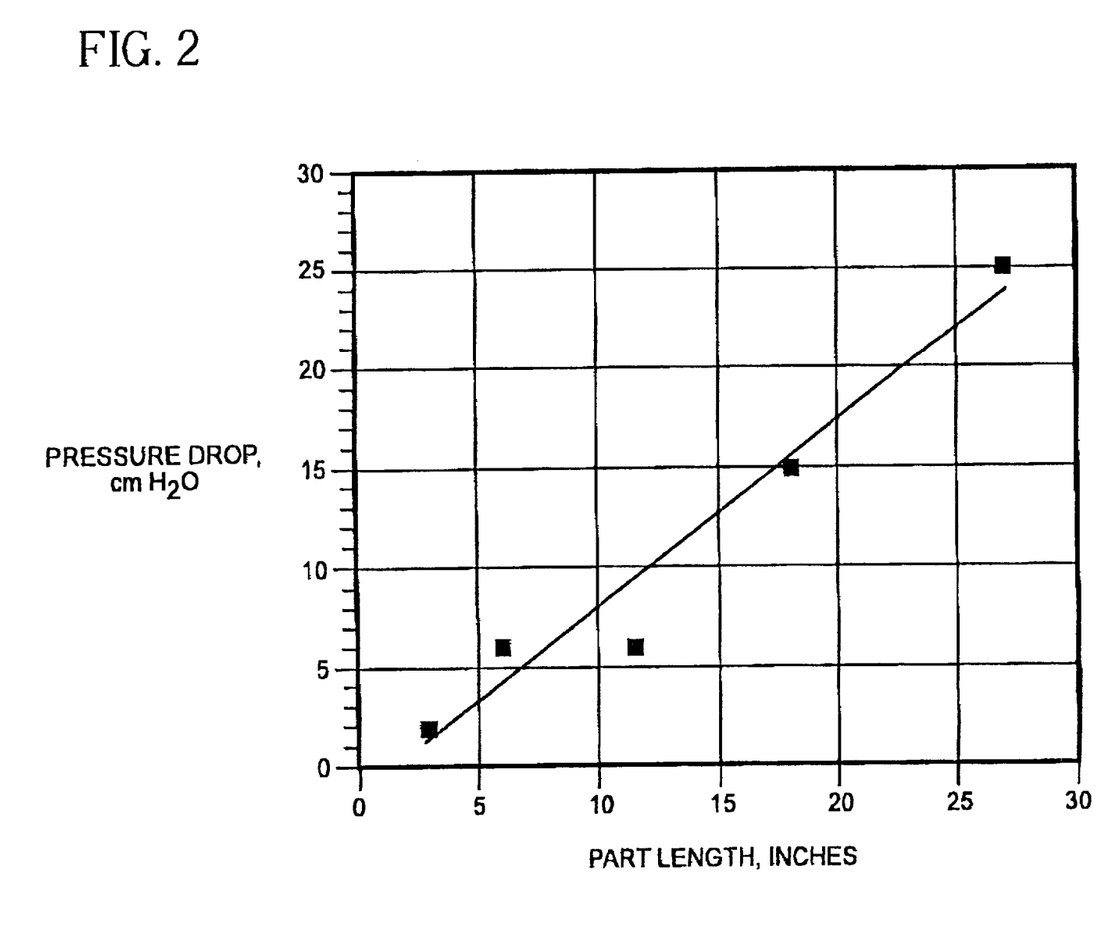
FIG. 2 presents a graph of pressure drop as a function of filter length for a cordierite porous ceramic filter.

One manifestation of this effect is illustrated in FIG. 2, which is a graph of filter pressure drop (plotted on the vertical axis in cm of $H_2O$) versus filter length (plotted on the horizontal axis in inches) for a series of filters of identical wall thickness, cell density and volume. As expected, the data reflect a linear dependence of filter pressure drop on the length of the filter (i.e., the pressure drop across a filter increases in longer filters).

Filters in accordance with the present invention take advantage of these hydraulic effects to provide filters with lower peak temperatures during regeneration and lower pressure drops for longer filter lengths.

This combination of properties is secured through a filtering system that includes a plurality of short end-plugged honeycomb structures configured to allow for substantially equal exhaust flow through them. Individually, the honeycomb structures have a length of about 7.62–20.32 cm (3–8 inches).

Figure 3:
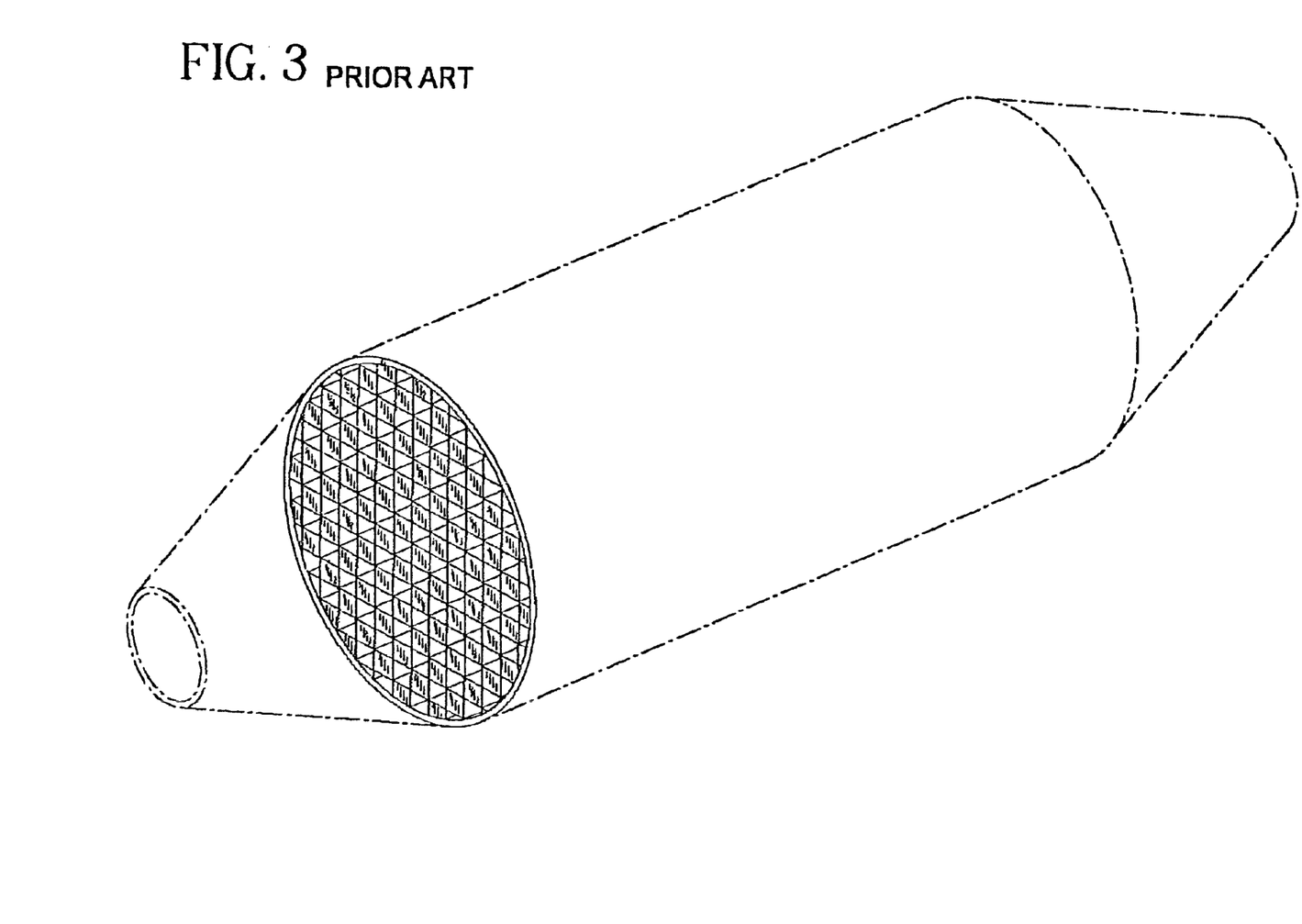
FIG. 3 presents a ceramic filter which includes a single end-plugged honeycomb structure.

The prior art filter is a single filter design as illustrated in FIG. 3. This filter is limited in use by its length. Specifically, above certain lengths, such as 30.32–25.4 cm (8–10 inches), the filter temperature during regeneration and the pressure drop across the filter become so large that the filter fails due to melting and/or cracking. Therefore, although it may be possible to manufacture long single filters greater than 20.32 cm (8 inches) inches, practically such filters are not suitable for the conditions encountered in diesel exhaust systems.

The inventive filtering system is not limited by filter length in that it comprises a plurality of end-plugged honeycomb structures which in combination act to trap and combust diesel exhaust particulates, and are configured to allow for substantially equal exhaust flow through each end-plugged honeycomb. This filter design mimics a single filter in that the exhaust flow is filtered concurrently through the end-plugged honeycombs, however, without the disadvantages associated with such a design.

Figure 4A:
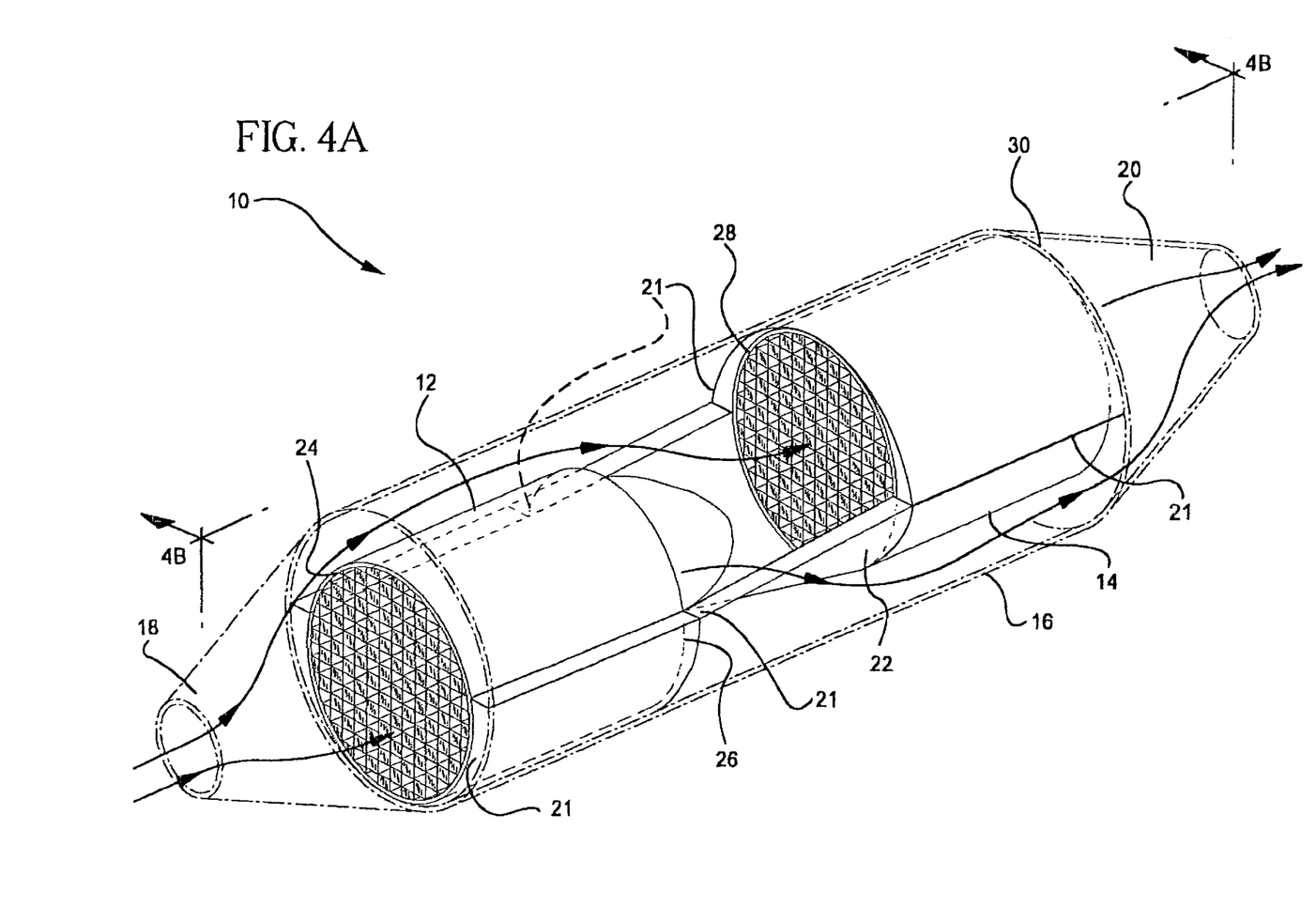
FIG. 4a presents a perspective view of an embodiment of the inventive filters which includes two end-plugged honeycomb structures arranged in parallel with respect to the exhaust gas flow.
Figure 4B:
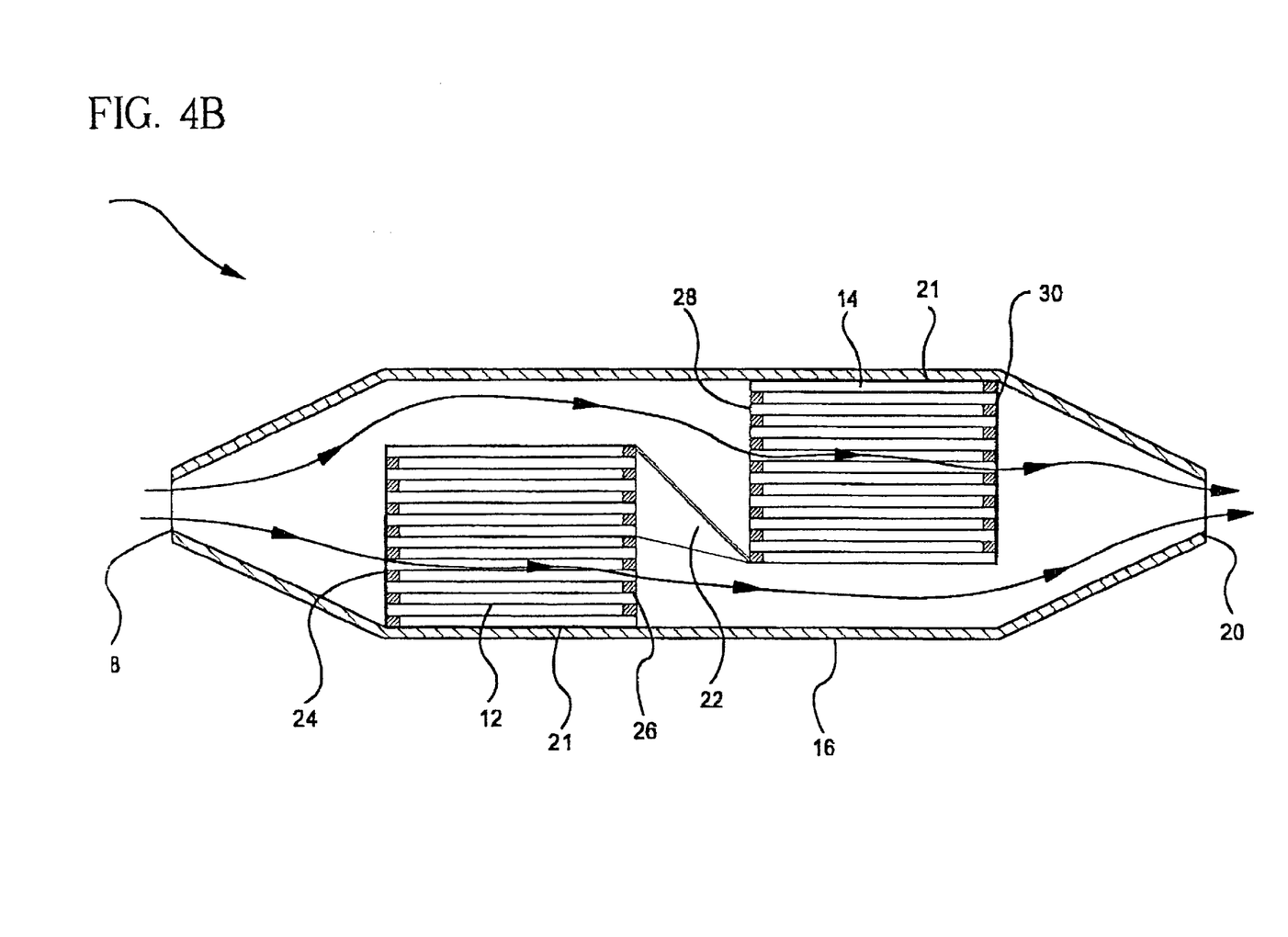

An embodiment of the inventive filter is presented in FIGS. 4a (perspective view) and 4b (cross-sectional view). The embodiment is shown to include two-end plugged honeycomb structures positioned parallel to the flow of diesel exhaust (i.e., the cells of the honeycombs are parallel to the exhaust flow). The honeycomb structures are preferably circular in cross-section.

Inventive filter 10 includes first end-plugged honeycomb 12 and second end-plugged honeycomb 14. The two honeycomb structures are shown being housed by enclosure 16, such as a cylindrical steel filter enclosure. The enclosure is shown to illustrate the design of the inventive filtering system in a vehicle exhaust system. Other enclosures as known in the art or as required by a specific application are also suitable.

Enclosure 16 is provided with an inlet cone 18 and an outlet cone 20 for channeling exhaust gas through the filtering device. First honeycomb 12 is adjacent inlet cone 18 and second honeycomb 14 is adjacent outlet cone 20. The honeycombs are positioned off-center within enclosure 16, to be parallel to the flow of diesel exhaust gas. First honeycomb 12 has a first honeycomb inlet face 24 and a first honeycomb outlet face 26. Second honeycomb has a second honeycomb inlet face 28 and a second honeycomb outlet face 30.

Means for separating the unfiltered exhaust gas entering the filter from the exhaust gas filtered by honeycombs 12 and 14 are provided for the inventive filter 10, as described hereinafter. Refractory resilient mat 21 is disposed partially (about half-way) between the sidewalls of honeycombs 12 and 14 and the wall of enclosure 16, as shown in FIG. 4a, to ensure that the unfiltered exhaust gas flows through first honeycombs 12 and 14. The flow of the exhaust gas is indicated by arrows. Panel 22 is positioned between first honeycomb 12 and second honeycomb 14 and functions to prevent interference between the filtered gas exiting first honeycomb 12 and the unfiltered gas entering second honeycomb 14. Specifically, panel 22 is mounted at first honeycomb outlet face 26 and second honeycomb inlet face 28.

Exhaust gas flows substantially equally through each of first honeycomb 12 and second honeycomb 14, in filtering system 10, as indicated by the arrows in FIGS. 4a and 4b. It has been observed that there occurs "self-leveling" effect in the exhaust flow during soot deposition on the honeycombs in the inventive filter. Specifically, if the exhaust flow is higher through one of the honeycomb structures the pressure drop across that structure would increase and force the exhaust to flow preferentially through the other filter. Hence the exhaust flow is evenly distributed and the exhaust is filtered by both honeycomb structures concurrently.

Filtering system 10 may have any length desired or required by the exhaust system chosen. Preferably the length is at least 20.32 cm (8 inches), although the length may be as short as 15 cm (6 inches). The individual honeycombs may be of equal length or have differing lengths, and may be of any size as long as the system dimensions are met.

For example, if a filter of 14 inches (about 35.56 cm) in length is required, in an embodiment of the present invention of a diesel particulate filter which comprises two (2) diesel traps, each individual honeycomb structures could have a length of a length of $\leq 7$ inches (about 17.78 cm).

Figure 5A:
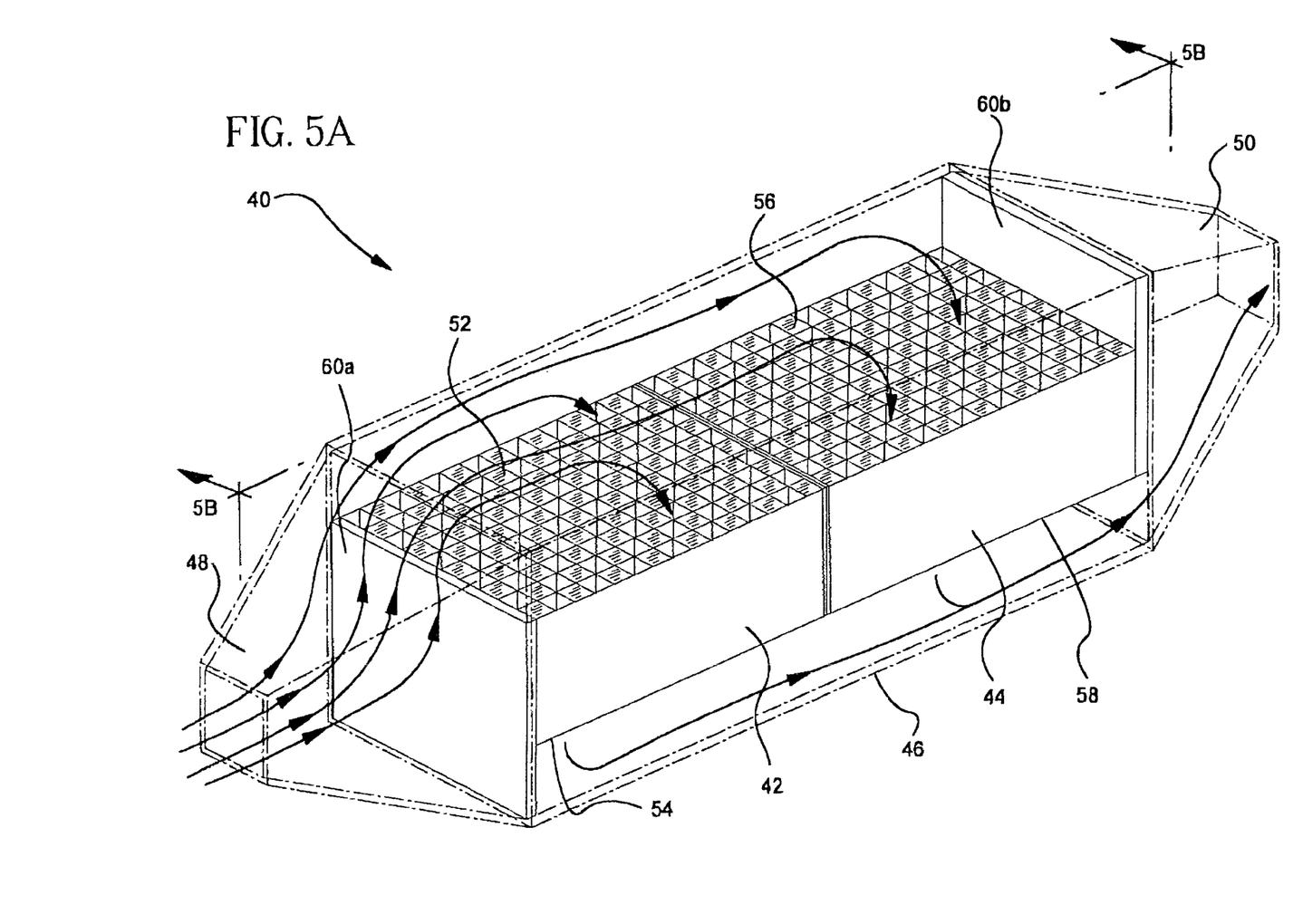
FIG. 5a presents a perspective view of another embodiment of the inventive filters which includes a two end-plugged honeycomb structures arranged in perpendicular with respect to the exhaust gas flow.
Figure 5B:
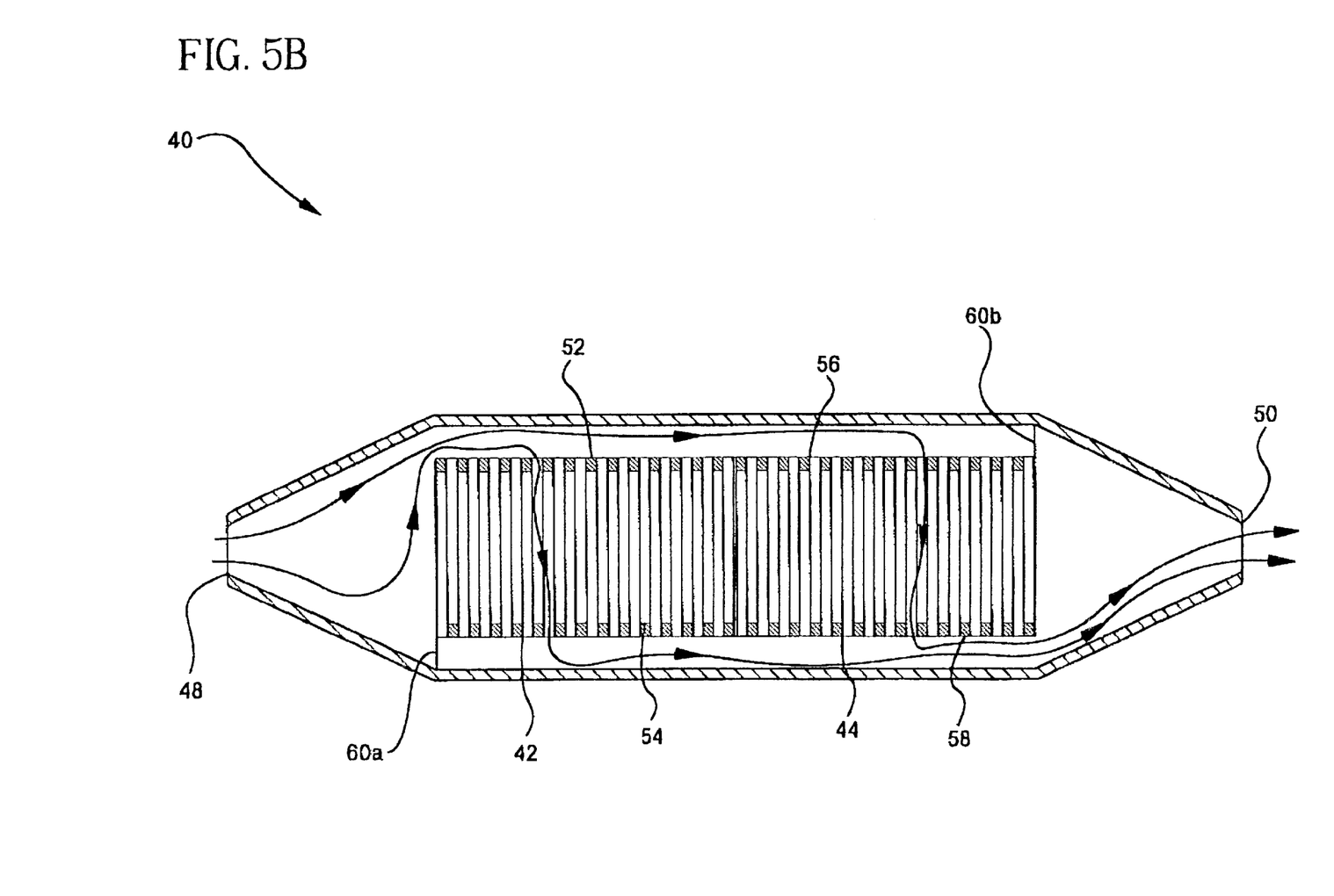

Another embodiment of the present invention is shown in FIGS. 5a (perspective view) and 5b (cross-sectional view).

The embodiment is shown to include two-end plugged honeycomb structures positioned perpendicular to the flow of diesel exhaust (i.e., the cells of the honeycombs are perpendicular to the exhaust flow). The honeycombs are preferably square in cross-section.

Inventive filter 40 includes first honeycomb 42 and second honeycomb 44. The two honeycombs are housed by enclosure 46, such as a rectangular steel filter enclosure. The enclosure is shown to illustrate the design of the inventive filtering system in a vehicle exhaust system. Other enclosures as known in the art or as required by a specific application are also suitable.

Enclosure 46 is provided with an inlet cone 48 and an outlet cone 50 for channeling exhaust gas through the filtering device. First honeycomb 42 is positioned adjacent inlet cone 48 and second honeycomb 44 is adjacent outlet cone 50. First honeycomb 42 and second honeycomb 44 are centrally positioned and mounted side-by-side in enclosure 46, to be perpendicular to the flow of exhaust gas. First honeycomb 42 has a first honeycomb inlet face 52 and a first honeycomb outlet face 54. Second honeycomb has a second honeycomb inlet face 56 and a second honeycomb outlet face 58.

Means for separating the unfiltered exhaust gas entering the filter from the exhaust gas filtered by honeycombs 42 and 44 are provided for the inventive filter 40, as described hereinafter. Panel 60a which is mounted to first honeycomb 42 at its sidewall adjacent inlet cone 48 directs unfiltered exhaust gas entering through inlet cone 48 to first honeycomb inlet face 52 and second honeycomb inlet face 56 and prevents the subsequently filtered gas exiting through first honeycomb outlet face 54 and second honeycomb outlet face 58 from backtracking through inlet cone 48. Another panel 60b which is mounted to second honeycomb 44 at its sidewall adjacent outlet cone 50 blocks unfiltered exhaust gas from exiting through outlet cone 50 before being filtered through first honeycomb 42 and second honeycomb 44; also, panel 60b channels the filtered exhaust gas out of filter 40 through outlet cone 50.

Exhaust gas flow substantially equally through each of first honeycomb 42 and second honeycomb 44, in filtering system 40. It has been observed that there occurs "self-leveling" effect in the exhaust flow during soot deposition on the honeycomb structures in the inventive filter. Specifically, if the exhaust flow is higher through one of the honeycomb structures the pressure drop across that structure would increase and force the exhaust to flow preferentially through the other filter. Hence the exhaust flow is evenly distributed and the exhaust is filtered by both honeycomb structures concurrently.

Filtering system 40 may have any length desired or required by the exhaust system chosen. Preferably the length is at least 20.32 cm (8 inches), although the length may be as short as 7.62 cm (3 inches). The individual honeycomb structures can be equal in length or have differing lengths, and can be of any size as long as the system dimensions are met.

End-plugged honeycomb structures of the type herein described are known as "wall flow" filters since the flow paths resulting from alternate channel plugging require the fluid being treated to flow through the porous ceramic cell walls prior to exiting the filter.

Suitable end-plugged honeycombs have cellular densities between about 1.5 to 46.5 cells/cm$^2$ (about 10 and 300 cells/in$^2$), more typically between about 15.5 to 46.5 cells/cm$^2$ about (100 and 300 cells/in$^2$). Wall thicknesses can vary upwards from the minimum dimension providing structural integrity, about 0.0254 cm (about 0.010 in.), but are generally less than about 0.051 cm (about 0.020 in.) to minimize filter volume.

Interconnected open porosity of the thin wall may vary, but is most generally greater than about 25% of thin wall volume and usually greater than about 35% to allow fluid flow through the thin wall longer dimensions. Diesel filter integrity becomes questionable above about 70% open pore volume; volumes of about 50% are therefore typical. For diesel particulate filtration it is believed that the open porosity may be provided by pores in the channel walls having mean diameters in the range of about 1 to 60 microns, with a preferred range between about 10 and 50 microns.

The honeycombs have part of the total number of cells plugged to allow better flow through the porous walls. A portion of the cells at the inlet end or face are plugged with a paste having same or similar composition to that of the green body, as described in U.S. Pat. No. 4,329,162 which is herein incorporated by reference. The plugging is only at the ends of the cells which is typically to a depth of about 9.5 to 13 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

The honeycombs may be made of any suitable material, such as ceramic, glass-ceramic and metal. Especially suited are ceramic materials, such as those that yield cordierite, mullite or a mixtures of these on firing.

The honeycombs described above are preferably circular or square in cross-section. However, other shapes such as oval and rectangular may be suitable as dictated by the particular exhaust system design selected for use.

A significant performance advantage of the inventive filter design is expected to reside in its reduced top temperature reached during regeneration of accumulated carbon soot. As indicated in FIG. 1, the temperature of a filter during the regeneration process is expected to depend strongly on the length of the filter, with shorter lengths offering a significant performance advantage over longer lengths. In the inventive filters the maximum temperature of the filter during the regeneration process preferably does not excess 1200° C., whereas in a single filter design of comparable length maximum temperatures of 1800° C. have been reported.

Another significant performance advantage of this filter design is expected to reside in its reduced rate of pressure drop increase as soot is collected in actual use. As indicated in FIG. 2, the rate of pressure drop is expected to depend strongly on length of the filter, with shorter lengths offering a significant performance advantage over longer length filters of the same volume, cell density and wall thickness. In the inventive filters the pressure drop increase is preferably about between 10% to 50% less than single filters of the same nominal length, total volume, cell density, wall thickness and total soot load.

To those skilled in the art to which this invention pertains, the above described preferred embodiments may be subject to change or modification. For instance, the filtering system may comprise three end-plugged honeycombs. Such change or modification can be carried out without departing from the scope of the invention, which is intended to be limited only by the scope of the appended claims.

What is claimed is:

1. A diesel exhaust particulate filter apparatus comprising:
    an enclosure provided with an inlet cone and an outlet cone, wherein exhaust gas flows through the inlet cone and out the outlet cone;

a first end-plugged honeycomb structure positioned adjacent the inlet cone, and a second end-plugged honeycomb structure positioned adjacent the outlet cone, wherein the first end-plugged honeycomb structure and the second end-plugged honeycomb structure are parallel to the flow of exhaust gas;

wherein the first end-plugged honeycomb structure and the second end-plugged honeycomb structure are mounted end-to-end and off-center within the enclosure;

means for separating the unfiltered exhaust gas entering the filter from the exhaust gas filtered by the first end-plugged honeycomb structure and the second end-plugged honeycomb structure.

2. The diesel exhaust particulate filter of claim 1 wherein both end-plugged honeycomb structures are made of cordierite.

3. The diesel exhaust particulate filter of claim 2 wherein both end-plugged honeycomb structures are circular in cross-section.

4. The diesel exhaust particulate filter of claim 3 wherein the diesel particulate filter has a length of at least 20.32 cm (8 inches).

5. An apparatus for purification of diesel exhaust, comprising:

an enclosure provided with an inlet cone and an outlet cone, wherein exhaust gas flows through the inlet cone and out the outlet cone;

a couple of end-plugged honeycomb structures centrally positioned within the enclosure and mounted side-by-side, wherein the honeycomb structures have a square cross-section means for separating the unfiltered exhaust gas entering the filter from the exhaust gas filtered by the first end-plugged honeycomb structure and the second end-plugged honeycomb structure.

6. The diesel exhaust particulate filter of claim 5 wherein both end-plugged honeycomb structures are made of cordierite.

7. The diesel exhaust particulate filter of claim 5 wherein diesel particulate filter has a length of at least 20.32 cm (8 inches).

* * * * *